United States Patent [19]

Okada et al.

[11] Patent Number: 5,521,901
[45] Date of Patent: May 28, 1996

[54] RE-WRITABLE PHASE CHANGE TYPE OPTICAL DISK WITH SUPPRESSED RECORDING MARK DISTORTION

[75] Inventors: Mitsuya Okada; Shuichi Ohkubo; Tatsunori Ide, all of Tokyo, Japan

[73] Assignee: NEC Corporation, Tokyo, Japan

[21] Appl. No.: 445,501

[22] Filed: May 22, 1995

[30] Foreign Application Priority Data

May 20, 1994 [JP] Japan .................................. 6-106997

[51] Int. Cl.$^6$ .............................. G11B 11/00; G11B 7/24
[52] U.S. Cl. ...................... 369/275.2; 369/13; 369/288; 428/694 DE
[58] Field of Search ............................ 369/275.1, 275.2, 369/13, 288, 275.3, 283, 284, 275.4, 286; 428/694 SC, 694 DE, 694 MT, 694 MM; 360/59, 114, 131; 365/122

[56] References Cited

U.S. PATENT DOCUMENTS

| | | | |
|---|---|---|---|
| 5,093,174 | 3/1992 | Suzuki et al. | 369/275.1 X |
| 5,341,349 | 8/1994 | Kagami et al. | 369/13 |
| 5,368,986 | 11/1994 | Terao et al. | 369/275.4 X |

FOREIGN PATENT DOCUMENTS

| | | |
|---|---|---|
| 0352105A3 | 1/1990 | European Pat. Off. . |
| 0360466A1 | 3/1990 | European Pat. Off. . |
| 0466670A3 | 1/1992 | European Pat. Off. . |
| 0566107A1 | 10/1993 | European Pat. Off. . |
| 2-3119 | 1/1990 | Japan . |
| 2-240842 | 9/1990 | Japan . |

OTHER PUBLICATIONS

Patent Abstracts of Japan; vol.: 14, No. 138; JPA 02003119; Mar. 15, 1990.
Patent Abstracts of Japan; vol.: 14, No. 561; JPA 02240842; Dec. 13, 1990.

*Primary Examiner*—Ali Neyzari
*Attorney, Agent, or Firm*—Sughrue, Mion, Zinn, Macpeak & Seas

[57] ABSTRACT

A phase change type optical disk includes a transparent substrate, a recording layer, a first transparent protection layer, a reflective layer, and a transparent interference layer. The recording layer is formed above the transparent substrate to cause a reversible phase change between a crystalline state and an amorphous state. The recording layer causes a phase change upon being irradiated with a laser beam, thereby recording, reproducing, and erasing information. The first transparent protection layer is formed on the recording layer to protect the recording layer. The reflective layer is formed above the recording layer to reflect light transmitted through the recording layer and causes the reflected light to be incident on the recording layer. The transparent interference layer is formed between the first protection layer and the reflective layer to cause light beams reflected by the reflective layer to optically interfere with each other. Light transmitted through the recording layer is multiple-reflected between the reflective layer and an interface between the interference layer and the first protection layer.

7 Claims, 3 Drawing Sheets

RE-WRITABLE PHASE CHANGE TYPE OPTICAL DISK WITH SUPPRESSED RECORDING MARK DISTORTION

BACKGROUND OF THE INVENTION

The present invention relates to an optical disk for recording information on it by employing a reversible phase change in accordance with laser beam irradiation.

Since the optical disk recording scheme employing a laser beam enables large-capacity recording and high-speed access in the non-contact manner, it has been put into practical use in the form of a large-capacity memory. Optical disks are classified into ROM optical disks (known as compact disks and laser disks), write-once optical disks (on which the user can record information), and re-writable optical disks (on and from which the user can repeatedly record and erase information). Write-once and re-writable optical disks will soon be used as external memories for computers, or for document and image files.

Re-writable optical disks include a phase change type optical disk (that utilizes the phase change of a recording film) and a magneto-optical disk (that utilizes changes in magnetization direction of a perpendicular magnetized film). Of these two types of disks, the phase change type optical disk is expected to be popular as a re-writable optical disk because (1) it does not require an external magnetic field, and (2) can easily perform an overwrite operation.

Conventionally, in the phase change type optical disk, a write access using a recording film that undergoes a phase change between the crystalline phase and the amorphous phase is performed in accordance with laser beam irradiation. A laser beam spot having a high power, in accordance with information to be recorded on the recording film, is irradiated on the phase change type optical disk to locally increase the temperature of the recording film. Recording is thus performed by causing a phase change between the crystalline phase and the amorphous phase. A change in the optical constant accompanying this phase change is read by a low-power laser beam as a difference in intensity of the reflected light, thereby reproducing the information.

For example, when a phase change type optical disk using a recording film has a comparatively long crystallization time the disk is rotated, and a laser beam is irradiated on the recording film of the disk to heat the recording film to a temperature equal to or higher than its melting temperature. After the laser beam passes, the disk is quickly cooled to set this portion in the amorphous state, thereby performing recording. During erasing, the recording film is exposed to temperatures in a crystallization enable temperature range between a crystallization temperature and melting temperature for a sufficiently long period of time required for promoting crystallization, so that the recording film is crystallized. To accomplish this, a know method of irradiating a laser beam having an elliptic spot in the laser beam traveling direction of the disk is used. To perform a pseudo-overwrite operation with two beams in which new information is recorded while erasing already recorded data, an erasing laser beam having an elliptic spot is irradiated upon the recording film preceding a recording laser beam having a circular spot.

When a disk using a phase change recording film capable of high-speed crystallization is employed, a single laser beam focused to have a circular spot is used. According to a conventional method, a phase change between the crystalline and amorphous states is caused by changing the power of the laser beam between two levels. More specifically, when a laser beam having a power that can heat the recording film to a temperature equal or greater than to the melting temperature or more is irradiated on the recording film, most of the recording film is set in the amorphous state upon being cooled. Meanwhile, when a laser beam having a power that heats the recording film to a temperature of greater than or equal to the crystallization temperature, but less than or equal to the melting temperature is irradiated on the recording film, most of the recording film is set in the crystalline state.

To form the recording film of a phase change type optical disk, GeSbTe, InSbTe, InSe, InTe, AsTeGe, $TeO_x$—GeSn, TeSeSn, SbSeBi, or BiSeGe belonging to a chalcogenide-based material is employed. Material is deposited in accordance with resistance heating vacuum deposition, electron beam vacuum deposition, sputtering, or the like. The recording film, immediately after deposition, is set in a kind of amorphous state. The entire recording film is set in the crystalline state by initialization so that an amorphous recorded portion is formed upon recording information on the recording film. Recording is achieved by forming an amorphous portion in the recording film which is in the crystalline state.

As described above, conventionally, in a phase change type optical disk, a difference in light amount between the light reflected by the recorded portion and that reflected by the erased portion is mainly detected as a reproduced signal. Generally, however, when the amount of light reflected by the recorded portion differs from that reflected by the erased portion, the absorption of the recorded portion differs from that of the erased portion. In an overwrite operation, a recording mark distortion caused by this absorption difference occurs.

In order to eliminate this recording mark distortion a phase change type optical disk, in which heat energies required for melting the recording mark portion in recording laser irradiation and the erased portion are set equal by controlling the absorption difference is very effective.

SUMMARY OF THE INVENTION

It is an object of the present invention to provide a phase change type optical disk in which heat energies, i.e., laser powers for recording, required for melting a recorded portion and an erased portion are set equal so that a recording mark distortion occurring in an overwrite operation is suppressed as much as possible.

In order to achieve the above object, according to the present invention, there is provided a phase change type optical disk comprising a transparent substrate, a recording layer, formed above the transparent substrate, for causing a reversible phase change between a crystalline state and an amorphous state, the recording layer causing a phase change upon being irradiated with a laser beam, thereby recording, reproducing, and erasing information, a first transparent protection layer, formed on the recording layer, for protecting the recording layer, a reflective layer, formed above the recording layer, for reflecting light transmitted through the recording layer and causing the reflected light to be incident on the recording layer, and a transparent interference layer, formed between the first protection layer and the reflective layer, for causing light beams reflected by the reflective layer to optically interfere with each other, light transmitted through the recording layer being multiple-reflected between the reflective layer and an interface between the interference layer and the first protection layer.

A phase change recording film has two states: the crystalline state and the amorphous state. The melting latent heat and the thermal conductivity are larger in the crystalline state. Thus, in order to melt both the crystalline portion and the amorphous portion with the same laser power irradiation during recording, the crystalline portion must absorb a larger heat energy.

Generally, when a signal is to be reproduced while setting a portion in the amorphous state to have a low reflectance and a portion in the crystalline state to have a high reflectance, in a conventional medium arrangement as shown in FIG. 4 in which an underlying protection layer 12, a recording layer 13, an upper transparent protection layer 14, and a reflective layer 15 are sequentially formed on a transparent substrate 11, the absorption of a portion in the amorphous state exceeds that in the crystalline state. Thus, a condition wherein the absorption of the portion in the crystalline state exceeds that in the amorphous state cannot be realized.

According to the present invention, the transparent protection layer, the interference layer, and the reflective layer are sequentially formed on the recording film to cause optical interference among multiple-reflected light beams generated at the interfaces of these layers, so that the heat energy required for melting a recording mark portion as an amorphous portion and that required for melting an erased portion as a crystalline portion are set equal.

As is known in the optical theory, when an upper transparent protection layer, an interference layer, and a reflective layer are provided on a recording layer, light transmitted through the recording layer is reflected by the reflective layer through the upper transparent protection layer and the interference layer, and is returned to the recording layer. The phase of the return light causing optical interference at this time can be adjusted by controlling the film thicknesses of the respective layers, thereby controlling the amount of light absorbed by the recording layer. Although the optical constant of the recording layer differs between the amorphous state and the crystalline state, the temperature increase rates in the recording layer in the two states can be set equal by selecting the film thicknesses.

More specifically, assume that the absorption of the recording layer in the amorphous state, the absorption of the recording layer in the crystalline state, the reflectance of the disk in the amorphous state, the reflectance of the disk in the crystalline state, the absorption of the reflective layer in the amorphous state, and the absorption of the reflective layer in the crystalline state are Aa, Ac, Ra, Rc, ARa, and ARc, respectively. In the disk according to the present invention, under the following conditions:

$$Aa+ARa+Ra=100\%$$

$$Ac+ARc+Rc=100\%$$

$$Rc>Ra \quad (1)$$

it is easy to realize $$Ac \geq Aa \quad (2)$$

FIG. 2 is a graph showing changes in Ra, Rc, Aa, and Ac while changing the film thickness of the upper transparent protection layer under the conditions that a ZnS—SiO$_2$ underlying protection layer (260-nm thick), a Ge$_2$Sb$_2$Te$_5$ recording layer (15-nm thick), a ZnS—SiO$_2$ upper transparent protection layer, an Si interference layer (20-nm thick), and an Al reflective layer (60-nm thick) are sequentially formed. Desired conditions expressed by equations (1) and inequality (2) can be realized when the upper transparent protection layer has a film thickness of about 10 to 40 nm or about 150 to 220 nm.

FIG. 3 is a graph showing changes in Ra, Rc, Aa, and Ac while changing the film thickness of the Si interference layer under the conditions that a ZnS—SiO$_2$ underlying protection layer (260-nm thick), a Ge$_2$Sb$_2$Te$_5$ recording layer (15-nm thick), a ZnS—SiO$_2$ upper transparent protection layer (20-nm thick), an Si interference layer, and an Al reflective layer (60-nm thick) are sequentially formed. Desired conditions which are the same as those described above can be realized when the interference layer has a film thickness of about 20 to 30 nm or about 110 to 120 nm.

Japanese Patent Laid-Open No. 2-240842 shows a melt-erasable phase change type optical disk in which a recording film is formed on a substrate and a light-absorbing film is provided adjacent to the recording film. According to the technique of this optical disk, the light-absorbing layer serves as a heat absorbing layer, and heat generated upon heating is absorbed by both the recording layer and the light-absorbing layer, thereby suppressing a difference in absorption caused by a phase change. However, since the light-absorbing layer made of a metal or the like is formed in contact with the recording layer, light absorption control utilizing optical interference between the interference layer and the reflective layer cannot be performed, unlike in the present invention. Since the absorption in the amorphous state exceeds that in the crystalline state, the conditions of the absorption of the present invention cannot be realized. Since the technique of this optical disk is applicable only to a melt-erasable phase change type optical disk, the material that can be adopted to form the recording layer is limited. According to the present invention, however, this technique is applicable regardless of whether melting is not performed for erasing.

As the arrangement of an optical disk which seems similar to that of the present invention, for example, Japanese Patent Laid-Open No. 2-3119 shows an optical recording medium obtained by forming a medium layer and a protection layer on a substrate. According to this particular official gazette, since the film thicknesses are set such that the absorption becomes the maximum during optical erasing, information can be erased by employing a low irradiation energy. However, the arrangement disclosed in this official gazette merely improves the recording sensitivity by setting the film thicknesses such that the absorption becomes the maximum during optical erasing, and the absorption of heat energy cannot be controlled as desired, unlike in the present invention.

DESCRIPTION OF THE PREFERRED EMBODIMENT

A preferred embodiment of the present invention will be described with reference to the accompanying drawings.

Figure 1:
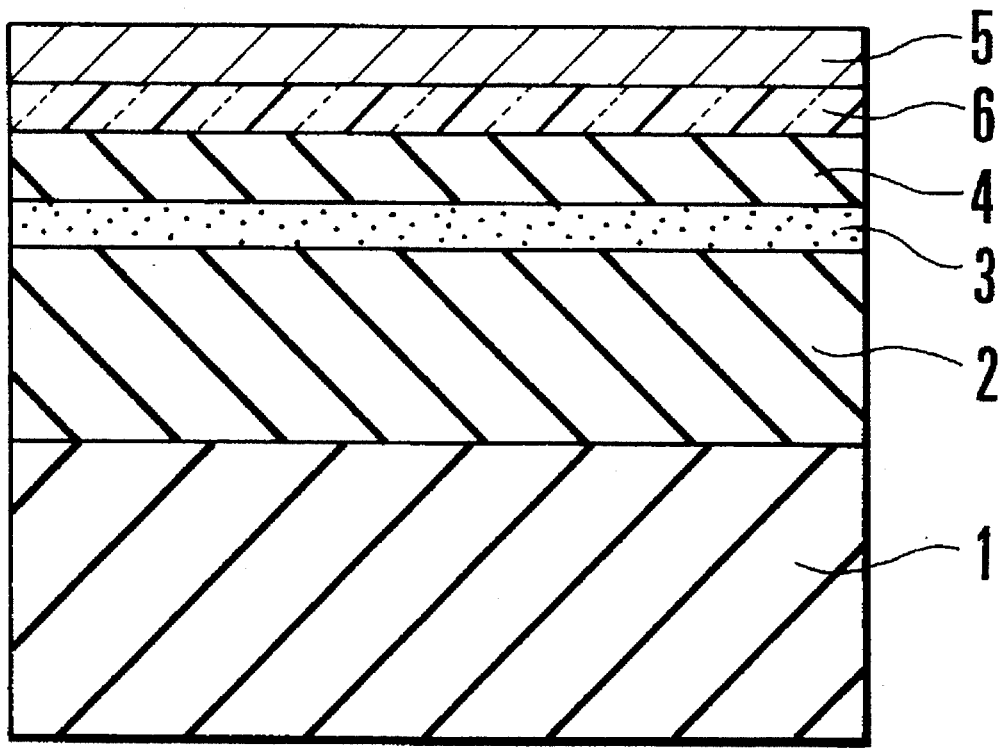
FIG. 1 is a view showing the arrangement of a phase change type optical disk according to the present invention.
Figure 2:
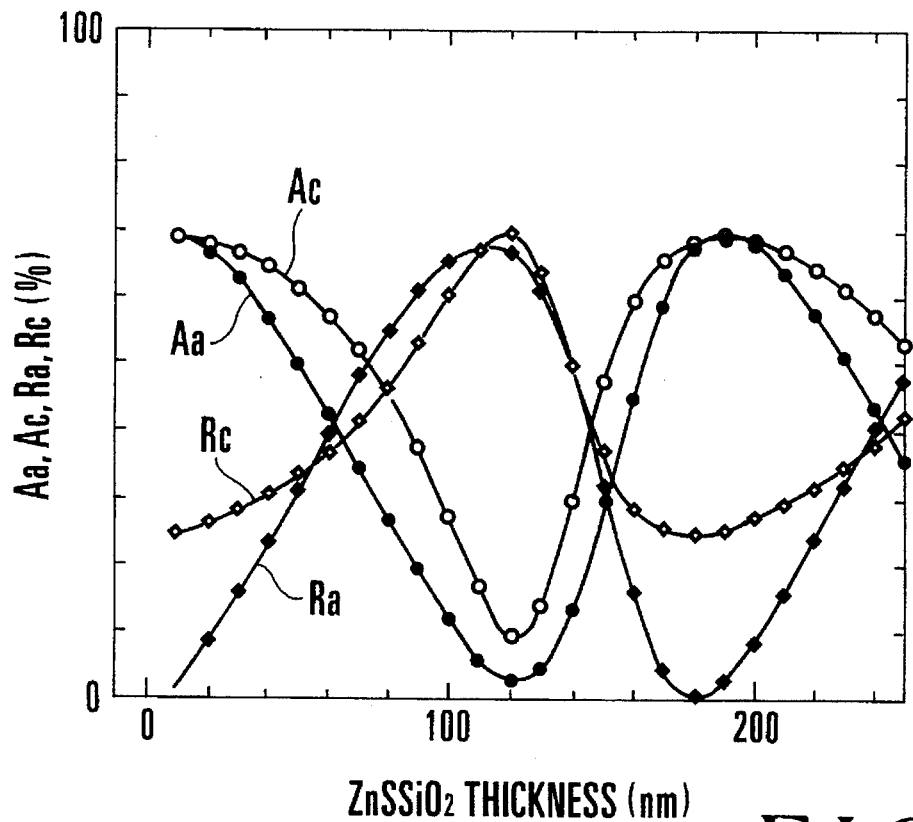
FIG. 2 is a graph showing the relationship between the film thickness of the upper transparent protection layer and the optical characteristics of the phase change type optical disk according to the present invention.
Figure 3:
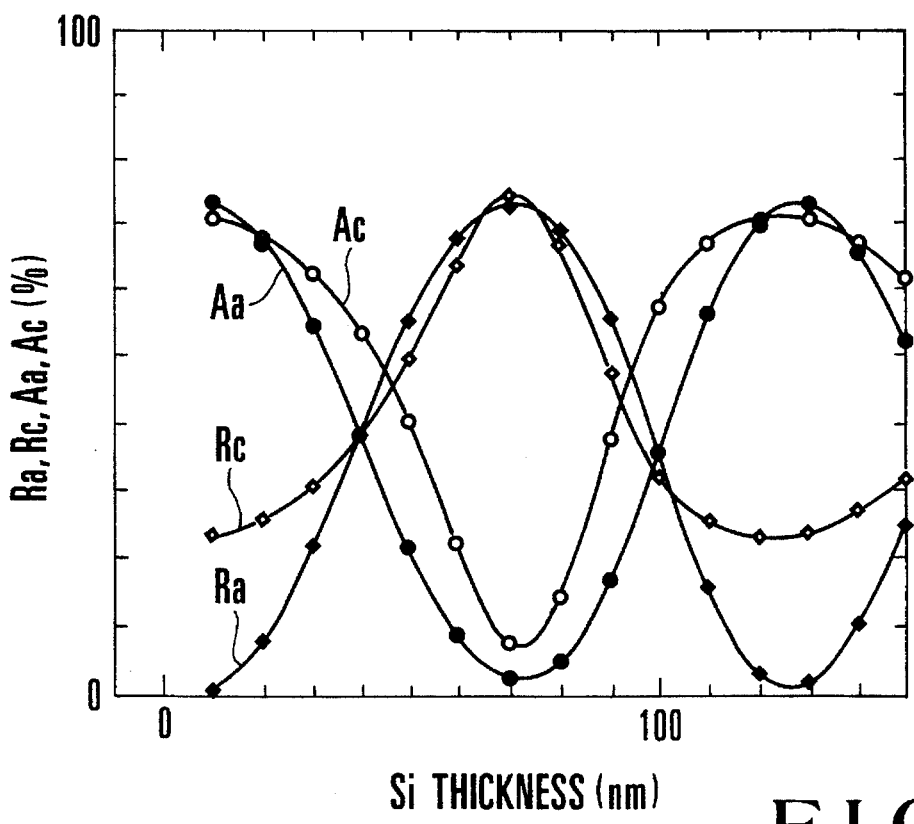
FIG. 3 is a graph showing the relationship between the film thickness of the interference layer and the optical characteristics of the phase change type optical disk according to the present invention.

FIG. 1 shows the arrangement of an optical disk according to the present invention. An underlying protection layer 2, a recording layer 3, an upper transparent protection layer 4, an interference layer 6, and a reflective layer 5 are sequentially formed on a transparent substrate 1.

The underlying protection layer 2 and the upper transparent protection layer 4 sandwich the recording layer 3 to protect it. The recording layer 3 causes a reversible phase change between the crystalline state and the amorphous state upon being irradiated with a laser beam, in order to record, reproduce, and erase information. The reflective layer 5 multiple-reflects light, transmitted through the recording layer 3, at the interface between the upper transparent protection layer 4 and the interference layer 6. When light is reflected by the interface between the recording layer 3 and the upper transparent protection layer 4, this reflected light is also multiple-reflected by the reflective layer 5. The interference layer 6 reflects and refracts light at its interface with the upper transparent protection layer 4, thereby causing multiple-reflected light beams including light reflected by the reflective layer 5 and passing through the recording layer 3 to optically interfere with each other. The phases of the multiple-reflected light beams that cause optical interference are adjusted by setting the interference layer 6 to have a predetermined film thickness, so that the absorption of the heat energy absorbed by the recording layer 3 is controlled. A similar effect can be obtained by setting the upper transparent protection layer 4 to have a predetermined film thickness.

A disk-shaped glass or plastic member is used as the transparent substrate 1. $SiO_2$, $Si_3N_4$, AlN, $TiO_2$, ZnS, ZnS—$SiO_2$, $Ta_2O_5$, or the like is used as the material of the underlying protection layer 2 and the upper transparent protection layer 4. GeSbTe, InSbTe, InSe, InTe, AsTeGe, $TeO_x$—GeSn, TeSeSn, SbSeBi, or BiSeGe belonging to the chalcogenide-based material is used to form the recording layer 3. A transparent dielectric material is used to form the interference layer 6. A material having an optical constant different from that of the upper transparent protection layer 4 is preferable. For example, SiO, Si, Ge, $MgF_2$, $Al_2O_3$, $In_2O_3$, $ZrO_2$, or the like can be used to form the interference layer 6. A metal such as Al, Au, Cu, Ag, or Ti is used as the material of the reflective layer 5. With this arrangement, a condition wherein a larger heat energy is absorbed by the crystalline portion of the recording layer 3 can be realized by utilizing optical interference caused by the interference layer 6 and the reflective layer 5.

The underlying protection layer 2 can be omitted.

EXAMPLE 1

An underlying protection layer 2, a recording layer 3, an upper transparent protection layer 4, an interference layer 6, and a reflective layer 5 were sequentially formed on a transparent substrate 1. A 130-mm diameter polycarbonate substrate (having a thickness of 1.2 mm and a track pitch of 1.6 μm) was used as the transparent substrate 1. The underlying protection layer 2 (260-nm thick) made of ZnS—$SiO_2$, the $Ge_2Sb_sTe_5$, recording layer 3 (15-nm thick), the ZnS—$SiO_2$ upper transparent protection layer 4 (20-nm thick), the Si interference layer 6 (20-nm thick), and the Al reflective layer 5 (60-nm thick) were sequentially formed on the transparent substrate 1 in accordance with sputtering.

An overwrite operation was performed on the disk having the above arrangement, and the characteristics of the reproduced signal were evaluated. For measurement, an optical head having a 830-nm wavelength semiconductor laser mounted on it was used. While the disk after initialization was rotated at 3,600 r.p.m., an 8.4-MHz signal (duty: 50%) was recorded on tracks within a diameter of 30 mm. Thereafter, a 2.2-MHz signal (duty: 50%) was overwritten on the same track. The recording power and the erasing power were respectively set to 12 mW and 6 mW so that the second harmonic distortion of the reproduced signal becomes the minimum. This track was reproduced, and the jitter of the reproduced signal obtained at the edge of the recording edge was measured. The jitter of the 2.2-MHz signal after the overwrite operation was almost the same as that obtained after initial recording wherein any overwrite operation was not performed.

Comparative Example 1

Figure 4:
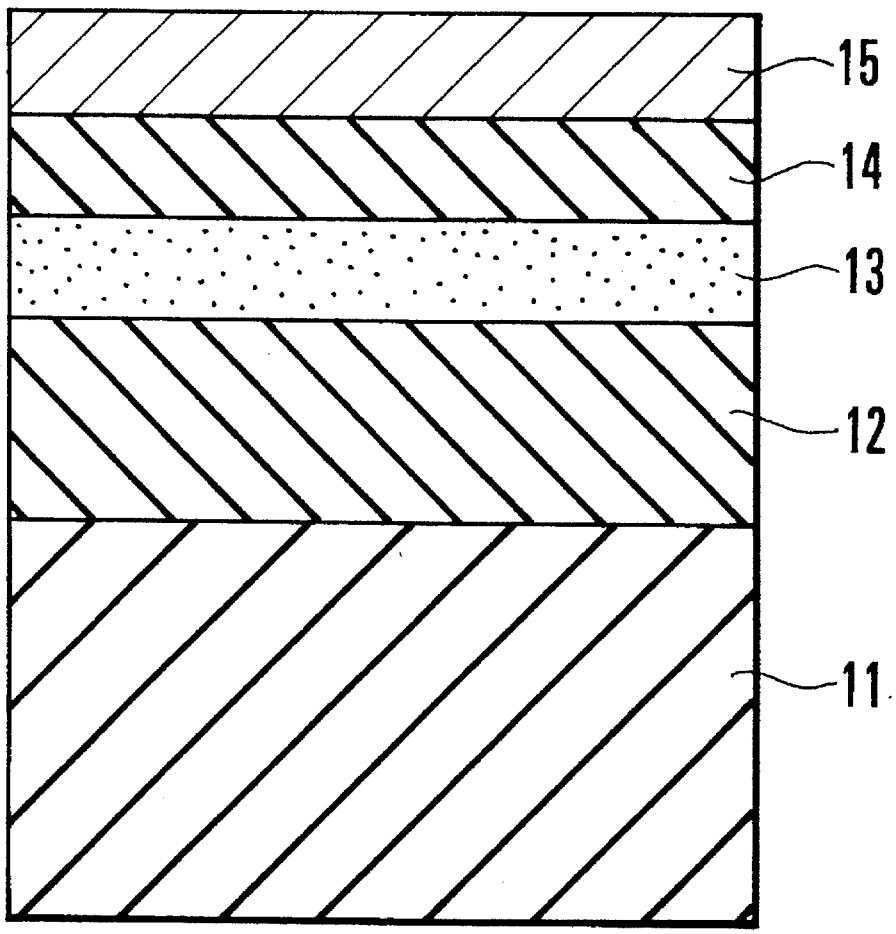
FIG. 4 is a view showing the arrangement of a conventional phase change type optical disk.

For the purpose of comparison, an overwrite operation was performed on a conventional disk having the same arrangement as that of FIG. 4, which did not have an interference layer and to which the present invention was not applied, and a jitter was measured. Recording, erasing, and reproduction were performed with an optical head on which an 830-nm wavelength semiconductor laser was mounted. When a 2.2-MHz signal was overwritten after an 8.4-MHz signal was recorded, the jitter was increased to about twice that obtained after the first recording.

As has been described above, according to the present invention, the difference in temperature increase amount between the recording mark and the erased portion in overwrite can be eliminated. Thus, a distortion occurring at the edge of the mark can be suppressed, so that high-precision edge detection is enabled, thereby enabling high-density recording.

What is claimed is:

1. A phase change type optical disk comprising:

a transparent substrate;

a recording layer, formed above said transparent substrate, for (1) causing a reversible phase change between a crystalline state and an amorphous state, upon being irradiated with a laser beam and (2) thereby recording, reproducing, and erasing information;

a first transparent protection layer, formed on said recording layer, for protecting said recording layer;

a reflective layer, formed above said recording layer, for reflecting light transmitted through said recording layer and causing the reflected light to be incident on said recording layer; and a transparent interference layer, formed between said first transparent protection layer and said reflective layer, for causing light beams reflected by said reflective layer to optically interfere with each other;

wherein light transmitted through said recording layer is multiple-reflected between said reflective layer and an interface between said transparent interference layer and said first transparent protection layer.

2. A disk according to claim 1, further comprising a second transparent protection layer, formed between said transparent substrate and said recording layer, for protecting said recording layer.

3. A disk according to claim 1, wherein said transparent interference layer has an optical constant which is different from that of said first transparent protection layer.

4. A disk according to claim 3, wherein:

said first transparent protection layer is made of one material selected from the group consisting of $SiO_2$, $Si_3N_4$, AlN, $TiO_2$, ZnS, ZnS—$SiO_2$, and $Ta_2O_5$, and said transparent interference layer is made of one material selected from the group consisting of SiO, Si, Ge, MgF$_2$, Al$_2$O$_3$, In$_2$O$_3$, and ZrO$_2$.

5. A disk according to claim 1, wherein said transparent interference layer has a predetermined thickness to adjust phases of multiple-reflected light beams, thereby controlling absorption of heat energy by said recording layer.

6. A disk according to claim 1, wherein said first transparent protection layer has a predetermined thickness to adjust phases of multiple-reflected light beams, thereby controlling absorption of heat energy by said recording layer.

7. A phase change type optical disk comprising, in order:

a transparent substrate;

an underlying transparent protective layer;

a recording layer;

an upper transparent protective layer;

a transparent interference layer; and a reflective layer;

wherein irradiating a selected portion of said recording layer with a laser beam causes a reversible phase change of said selected portion between a crystalline phase and an amorphous phase;

wherein a respective phase of said selected portion represents information, and said reversible phase change permits recording, reproducing, and erasing of said information;

wherein said underlying and said upper transparent protective layer protect said recording layer;

wherein light transmitted through said recording layer is reflected by said reflective layer to provide (1) reflected light incident on said recording layer and (2) multiple-reflected light between said reflective layer and an interface between said interface layer and said upper transparent protective layer;

wherein said transparent interference layer (1) causes optical interference among light beams of said reflected light, (2) has an optical constant which is different from that of said upper transparent protective layer, and (3) has a predetermined thickness to adjust phases of said multiple-reflected light, thereby controlling absorption of heat energy by said recording layer;

wherein said upper transparent protection layer is one of SiO$_2$, Si$_3$N$_4$, AlN, TiO$_2$, ZnS, ZnS—SiO$_2$, and Ta$_2$O$_5$; and wherein said transparent interference layer is one of SiO, Si, Ge, MgF$_2$, Al$_2$O$_3$, In$_2$O$_3$, and ZrO$_2$.

\* \* \* \* \*